United States Patent
Inui et al.

(10) Patent No.: US 10,272,366 B2
(45) Date of Patent: Apr. 30, 2019

(54) INFILTRATION INTAKE SYSTEM

(71) Applicant: HITACHI ZOSEN CORPORATION, Osaka-shi, Osaka (JP)

(72) Inventors: Masaki Inui, Osaka (JP); Takayuki Inoue, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 0 days.

(21) Appl. No.: 15/557,238

(22) PCT Filed: Nov. 4, 2015

(86) PCT No.: PCT/JP2015/081039
§ 371 (c)(1),
(2) Date: Sep. 11, 2017

(87) PCT Pub. No.: WO2016/143191
PCT Pub. Date: Sep. 15, 2016

(65) Prior Publication Data
US 2018/0050283 A1    Feb. 22, 2018

(30) Foreign Application Priority Data

Mar. 12, 2015    (JP) .................. 2015-049576

(51) Int. Cl.
*E03B 3/04*     (2006.01)
*B01D 24/12*    (2006.01)
(Continued)

(52) U.S. Cl.
CPC ........... *B01D 24/10* (2013.01); *B01D 24/002* (2013.01); *B01D 24/12* (2013.01); *B01D 24/14* (2013.01);
(Continued)

(58) Field of Classification Search
CPC . E02B 8/02; E02B 8/023; E02B 8/026; E03B 3/04; E03B 3/36; B01D 24/12; B01D 24/4631; B01D 24/4636
USPC ........ 210/162, 170.09, 170.1, 170.11, 747.5; 405/107, 127, 210
See application file for complete search history.

(56) References Cited

U.S. PATENT DOCUMENTS 344,813   A  *  7/1886  Bull .......................... E02B 9/04
                                                        405/127
629,578   A  *  7/1899  Maginn .................. E02B 3/023
                                                        210/170.1
(Continued)

FOREIGN PATENT DOCUMENTS

JP     01-094910 A    4/1989
JP     6-10331    *  1/1994
(Continued)

OTHER PUBLICATIONS

Machine translation of JP 6-10331, Jan. 1994.*
International Search Report PCT/JP2015/081039 dated Jan. 26, 2016 with English translation.

*Primary Examiner* — Christopher Upton
(74) *Attorney, Agent, or Firm* — Pillsbury Winthrop Shaw Pittman, LLP

(57) ABSTRACT

In this infiltration intake system, a structural body integrally includes a waster discharge direction control portion controlling a discharge direction for wastewater discharged from a filter toward a raw water side at a backwash time with a backwash mechanism portion in a prescribed wastewater discharge direction.

6 Claims, 6 Drawing Sheets

(51) Int. Cl.
*B01D 24/46* (2006.01)
*B01D 24/10* (2006.01)
*E02B 8/02* (2006.01)
*B01D 29/66* (2006.01)
*E03B 3/36* (2006.01)
*B01D 24/00* (2006.01)
*B01D 24/14* (2006.01)

(52) U.S. Cl.
CPC ......... *B01D 24/4631* (2013.01); *B01D 29/66* (2013.01); *E02B 8/026* (2013.01); *E03B 3/04* (2013.01); *E03B 3/36* (2013.01); *Y02A 20/112* (2018.01); *Y02E 10/22* (2013.01)

(56) References Cited

U.S. PATENT DOCUMENTS

| | | | | |
|---|---|---|---|---|
| 975,450 | A | * | 11/1910 | Ouimet ................. A01K 63/04 |
| | | | | 210/170.09 |
| 3,854,291 | A | * | 12/1974 | Perkins ................... E02B 8/023 |
| | | | | 210/170.1 |
| 4,335,977 | A | * | 6/1982 | Ihli ........................... E02B 3/04 |
| | | | | 405/127 |
| 2007/0108112 | A1 | * | 5/2007 | Jones ........................ E03B 3/00 |
| | | | | 210/170.11 |
| 2012/0125828 | A1 | * | 5/2012 | Watson ..................... E03B 3/04 |
| | | | | 210/162 |
| 2014/0224746 | A1 | | 8/2014 | Niizato et al. |
| 2014/0238924 | A1 | | 8/2014 | Niizato et al. |
| 2015/0314221 | A1 | | 11/2015 | Inui et al. |
| 2018/0056213 | A1 | * | 3/2018 | Inui ........................... E03B 3/04 |

FOREIGN PATENT DOCUMENTS

| | | |
|---|---|---|
| JP | 2012-246711 A | 12/2012 |
| JP | 2013-075268 A | 4/2013 |
| JP | 2013-086058 A | 5/2013 |
| JP | 2013-181371 A | 9/2013 |
| JP | 2014-117643 A | 6/2014 |
| JP | 2014-233701 A | 12/2014 |

* cited by examiner

FIRST EMBODIMENT

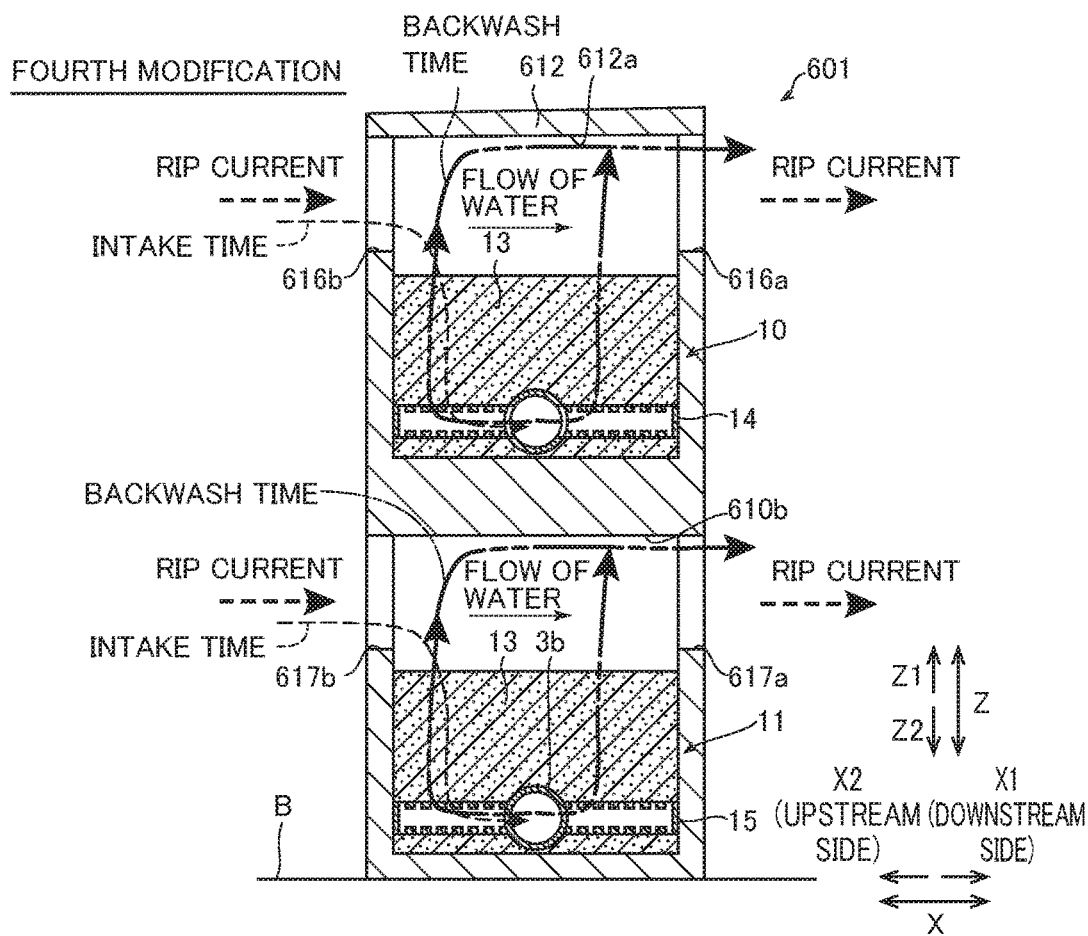

INFILTRATION INTAKE SYSTEM

CROSS-REFERENCE TO RELATED APPLICATIONS

This application is the U.S. National Stage of PCT/JP2015/081039, filed Nov. 4, 2015, which in turn claims priority to Japanese Patent Application No. JP 2015-049576, filed Mar. 12, 2015. The contents of these applications are incorporated herein by reference in their entireties.

TECHNICAL FIELD

The present invention relates to an infiltration intake system, and more particularly, it relates to an infiltration intake system including a structural body set in raw water.

BACKGROUND ART

An infiltration intake system including a structural body set in raw water is known in general, as disclosed in Japanese Patent Laying-Open No. 2013-75268, for example.

Japanese Patent Laying-Open No. 2013-75268 discloses an infiltration intake unit including a box-type housing set in seawater, a sand filtration layer stored in the housing, an intake pipe for supplying water passing through the sand filtration layer to a seawater desalination plant, a backwash pipe arranged above the sand filtration layer and a discharge pipe arranged above the sand filtration layer. The backwash pipe of this infiltration intake unit has a function of raising up foreign matter such as microorganisms and suspended substances accumulating on a surface layer of the sand filtration layer by injecting water or air. The discharge pipe has a function of injecting water for discharging the foreign matter raised up by the backwash pipe outward from the sand filtration layer.

PRIOR ART

Patent Document

Patent Document 1: Japanese Patent Laying-Open No. 2013-75268

SUMMARY OF THE INVENTION

Problems to be Solved by the Invention

However, the infiltration intake unit disclosed in Japanese Patent Laying-Open No. 2013-75268 must be provided with the discharge pipe and a driving source (e.g., a pump) for driving the discharge pipe to inject water separately from the backwash pipe, in order to inhibit wastewater from reaching a surface layer of a sand filtration layer of another infiltration intake unit. Therefore, the number of components constituting the infiltration intake unit is disadvantageously increased, and the structure of the infiltration intake unit is also disadvantageously complicated.

The present invention has been proposed in order to solve the aforementioned problems, and an object of the present invention is to provide an infiltration intake system capable of inhibiting wastewater from reaching a filter or the like of another structural body at a backwash time while suppressing increase in number of components and complication of the structure thereof.

Means for Solving the Problems

In order to attain the aforementioned object, an infiltration intake system according to an aspect of the present invention includes a structural body, set on a water bottom surface of raw water, including a filter storage portion, a filter stored in the filter storage portion, a water guide portion guiding treated water passing through the filter toward the side of a treatment equipment, and a backwash mechanism portion washing the filter by refluxing water or air from a treated water side of the filter toward a raw water side, while the structural body integrally includes a wastewater discharge direction control portion controlling a discharge direction for wastewater discharged from the filter toward the raw water side to a prescribed wastewater discharge direction at a backwash time with the backwash mechanism portion. The term "raw water" indicates water not yet filtrated through the filter. The wording "set on a water bottom surface" indicates a wide concept including not only a case where the structural body is simply set on the water bottom surface but also a case where the structural body is partially embedded in the water bottom surface.

In the infiltration intake system according to the aspect of the present invention, as hereinabove described, the structural body is integrally provided with the wastewater discharge direction control portion controlling the discharge direction for the wastewater discharged from the filter toward the raw water side to the prescribed wastewater discharge direction at the backwash time with the backwash mechanism portion. Thus, the wastewater can be inhibited from reaching a filter of another structural body at the backwash time without separately providing a water discharge pipe or a driving source for driving the water discharge pipe to inject water, by adjusting the discharge direction for the wastewater to the prescribed wastewater discharge direction other than a direction where another structural body is set, for example. Consequently, the wastewater can be inhibited from reaching the filter or the like of another structural body at the backwash time while suppressing increase in number of components and complication of the structure of the infiltration intake system.

In the infiltration intake system according to the aforementioned aspect, the wastewater discharge direction control portion preferably includes a guide portion guiding wastewater discharged upward from the filter toward the raw water to discharge the wastewater sidewise from the structural body at the backwash time. According to this structure, the wastewater discharged upward from the filter toward the raw water side can be discharged outward from the structural body through a side portion thereof at the backwash time due to the guide portion, whereby foreign matter contained in the wastewater can be inhibited from falling by its own weight and reaching the filter again.

In this case, the guide portion preferably has a ceiling surface formed above the filter storage portion in the structural body to be opposed to the filter storage portion and inclined obliquely upward toward the prescribed wastewater discharge direction previously set sidewise. According to this structure, the wastewater discharged upward can be reliably guided to the sidewisely set prescribed wastewater discharge direction along the ceiling surface inclined obliquely upward toward the sidewisely set prescribed wastewater discharge direction, whereby the same can be reliably discharged toward the prescribed wastewater discharge direction previously set sidewise.

In the aforementioned structure provided with the wastewater discharge direction control portion including the guide portion, the structural body preferably includes a first opening and a second opening so provided as to open on side portions of the structural body, and the second opening is preferably provided on the side of the prescribed wastewater discharge direction at the backwash time and preferably has a large opening area than the first opening. According to this structure, the wastewater is more easily discharged from the second opening having the larger opening area than the first opening as compared with from the first opening, whereby the same can be easily discharged from the second opening provided on the side of the wastewater discharge direction.

In the aforementioned structure provided with the wastewater discharge direction control portion including the guide portion, the structural body preferably includes a plurality of the filter storage portions stacked at prescribed intervals in the vertical direction, and a lower portion of the filter storage portion positioned on the upper side among the plurality of filter storage portions preferably constitutes the guide portion guiding the wastewater to discharge the wastewater sidewise from the structural body at the backwash time. According to this structure, the lower portion of the filter storage portion is so utilized as the guide portion that the wastewater can be discharged while effectively suppressing increase in number of components.

In the aforementioned structure provided with the wastewater discharge direction control portion including the guide portion, the guide portion is preferably configured to guide the wastewater discharge direction to a sidewise direction other than a direction where another structural body is set in the periphery. According to this structure, the wastewater can be reliably inhibited from reaching a filter of another structural body at the backwash time.

In the infiltration intake system according to the aforementioned aspect, the wastewater discharge direction control portion preferably includes a first opening and a second opening so provided as to opposedly open on side portions of the structural body, and the first opening and the second opening are preferably so arranged along a water flow direction toward the structural body in the raw water that the wastewater is discharged from the side of the first opening toward the side of the second opening. According to this structure, a flow of water from the side of the first opening toward the side of the second opening can be formed in the structural body through the water flow toward the structural body by simply providing the first opening and the second opening on the structural body along the water flow direction. Thus, the wastewater can be efficiently discharged from the second opening while suppressing complication of the structure of the infiltration intake system.

Effect of the Invention

According to the present invention, as hereinabove described, the infiltration intake system capable of inhibiting the wastewater from reaching the filter or the like of another structural body at the backwash time while suppressing increase in number of components and complication of the structure thereof can be provided.

BRIEF DESCRIPTION OF THE DRAWINGS

FIG. 11 A sectional view showing an infiltration intake structural body according to a fourth modification of the present invention.

MODES FOR CARRYING OUT THE INVENTION

Figure 1:
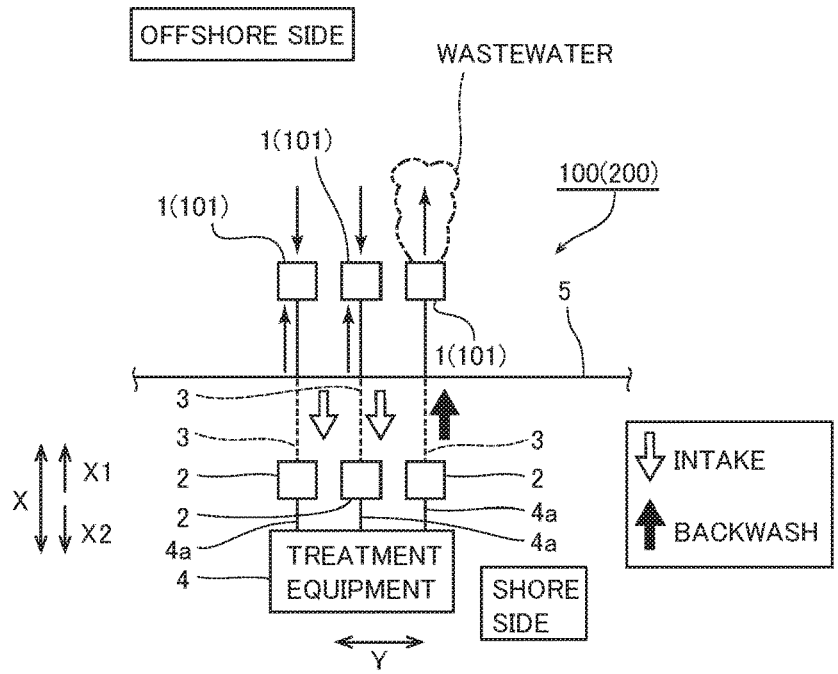
FIG. 1 A schematic diagram showing an example of a position where an infiltration intake structural body of an infiltration intake system according to a first embodiment of the present invention is set.

Embodiments of the present invention are now described with reference to the drawings.

[First Embodiment]

The overall structure of an infiltration intake system 100 according to a first embodiment of the present invention is described with reference to FIGS. 1 to 3.

(Structure of Infiltration Intake System)

The infiltration intake system 100 according to the first embodiment of the present invention is employed for obtaining clean and clear water (treated water) by removing foreign matter constituted of suspended solids such as driftwood, refuse, marine organisms, fluvial organisms, microorganisms such as planktons, suspended matter (insoluble matter having a particle diameter not more than a prescribed level) and the like from seawater (raw water) without performing injection of chemicals or the like. The infiltration intake system 100 includes a plurality of (e.g., three) infiltration intake structural bodies 1 set in the raw water for filtrating the raw water and turning the same into treated water, a plurality of intake wells 2 so provided as to correspond to the infiltration intake structural bodies 1 respectively for reserving the treated water received from the infiltration intake structural bodies 1 and intake pipes 3 connecting the infiltration intake structural bodies 1 and the intake wells 2 with each other. Alternatively, the plurality of infiltration intake structural bodies 1 may share a single intake well 2. The infiltration intake structural bodies 1 are examples of the "structural body" in the present invention, and the intake wells 2 and the intake pipes 3 are examples of the "backwash mechanism portion" and the "water guide portion" in the present invention respectively.

The plurality of infiltration intake structural bodies 1 are set to line up at prescribed intervals along the extensional direction (a direction Y) of a seashore 5. The treated water reserved in the intake wells 2 is pumped up with a pump (not shown) or the like provided on a treatment equipment 4 through intake pipes 4a and treated into desired water. When the treatment equipment 4 is a desalination plant, for example, clean and clear water (treated water) is further treated into domestic water such as drinking water by a reverse osmosis membrane method or an evaporation method. Examples of the treatment equipment 4 are a plant employing the treated water as cooling water, an aquarium employing the treated water for water tanks, a seawater pool and a speedboat racecourse employing the treated water as pool water, an aquaculture farm employing the treated water for aquaculture ponds and the like.

Figure 2:
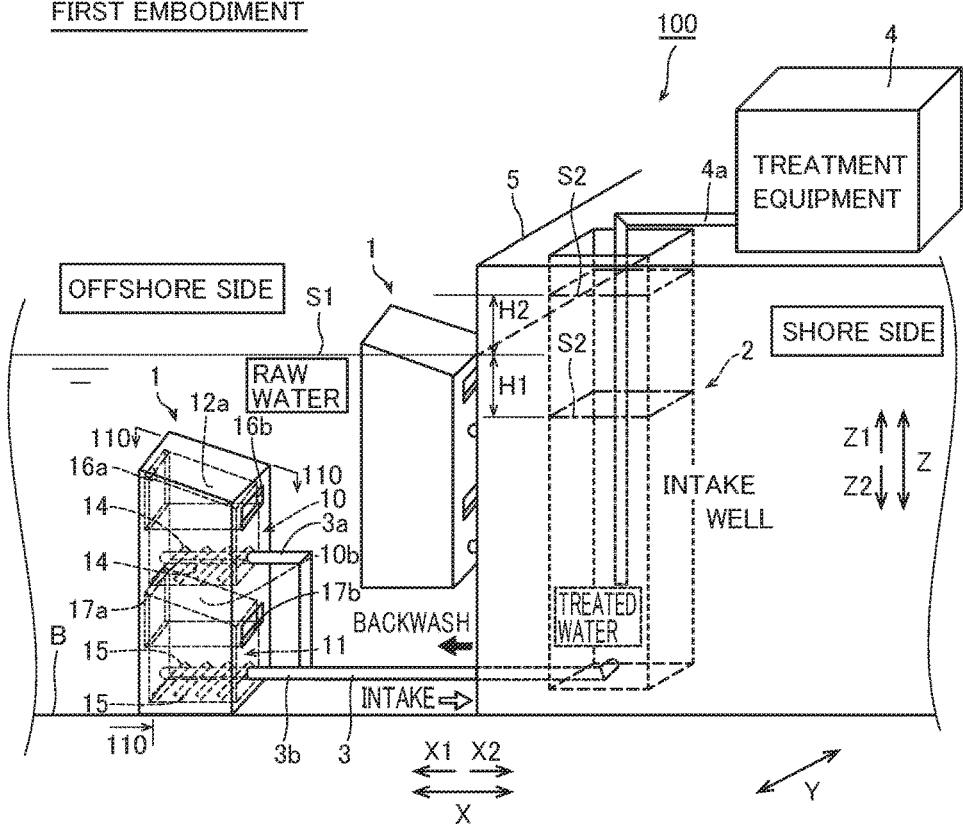
FIG. 2 A schematic perspective view showing the infiltration intake system according to the first embodiment of the present invention.

As shown in FIG. 2, each intake well 2 is formed on a shore side in the vicinity of the seashore 5 to have a prescribed depth in the vertical direction (a direction Z). The corresponding intake pipe 3 is connected to the vicinity of the bottom surface of the intake well 2. At an intake time, the water surface S2 (shown by a one-dot chain line) of the treated water reserved in the intake well 2 is rendered lower than the water surface S1 of the raw water by a water level difference H1 in the vertical direction, to cause water pressure from the raw water side (the side of the corresponding infiltration intake structural body 1) toward the treated water side (the side of the intake well 2) on the basis of the water level difference H1. The infiltration intake system 100 is configured to intake the treated water by circulating water in filters 13, described later, from the raw water side toward the treated water side through the water pressure.

When the intake speed is at least about 5 m/day, foreign matter so accumulates on surfaces (upper surfaces along arrow Z1) of the filters 13 as to easily block the filters 13. Therefore, the infiltration intake system 100 is configured to wash (backwash) the filters 13 by refluxing water therethrough from the treated water side (the side of the intake well 2) toward the raw water side (the side of the infiltration intake structural body 1). At this backwash time, the water surface S2 (shown by a two-dot chain line) of the treated water is rendered higher than the water surface S1 of the raw water by a water level difference H2, to cause water pressure from the treated water side water toward the raw water side on the basis of the water level difference H2. The infiltration intake system 100 is configured to reflux water through the filters 13 from the treated water side water toward the raw water side through the water pressure. Consequently, no periodic cleaning by a diver or the like is required in order to remove foreign matter accumulating on the filters 13.

The water level differences H1 and H2 can be properly adjusted by adjusting the volume of the treated water pumped up from the intake well 2 by the treatment equipment 4 thereby adjusting the vertical position of the water surface S2 of the treated water. Further, the speed (the intake speed or the backwash speed) of the water circulated through the filters 13 and the intake pipe 3 can be adjusted by adjusting the water level differences H1 and H2 thereby adjusting the magnitude of the water pressure. The intake speed is preferably at least about 5 m/day.

<Structure of Infiltration Intake Structural Body>

As shown in FIG. 2, each infiltration intake structural body 1 is so set on a water bottom surface B of the raw water that the same is entirely arranged in the raw water. Construction work for setting the infiltration intake structural body 1 has been performed on the water bottom surface B where the infiltration intake structural body 1 is set, thereby stably fixing the infiltration intake structural body 1. The cost for the construction work for setting the infiltration intake structural body 1 and the number of days required therefor can be remarkably curtailed as compared with a general infiltration intake method of intaking water by embedding an intake pipe under the water bottom surface B.

The infiltration intake structural body 1 is made of resin, FRP (fiber-reinforced plastic), steel, concrete or a composite thereof. Further, the appearance of the infiltration intake structural body 1 is in the form of a rectangular parallelepiped having an inclined upper surface.

The infiltration intake structural body 1 includes a pair of (a plurality of) filter storage portions 10 and 11 stacked in the vertical direction (the direction Z). The filter storage portions 10 and 11 are stacked at a prescribed interval in the vertical direction (the direction Z). A ceiling portion 12 (a ceiling surface 12*a*) forming an upper portion of the infiltration intake structural body 1 is integrally provided on the infiltration intake structural body 1 on a position above the upper filter storage portion 10 (along arrow Z1) oppositely to the filter storage portion 10. A lower portion 10*a* (a ceiling surface 10*b*) of the upper filter storage portion 10 is integrally provided on the infiltration intake structural body 1 on a position above the lower filter storage portion 11 (along arrow Z2) oppositely to the filter storage portion 11.

Figure 3:
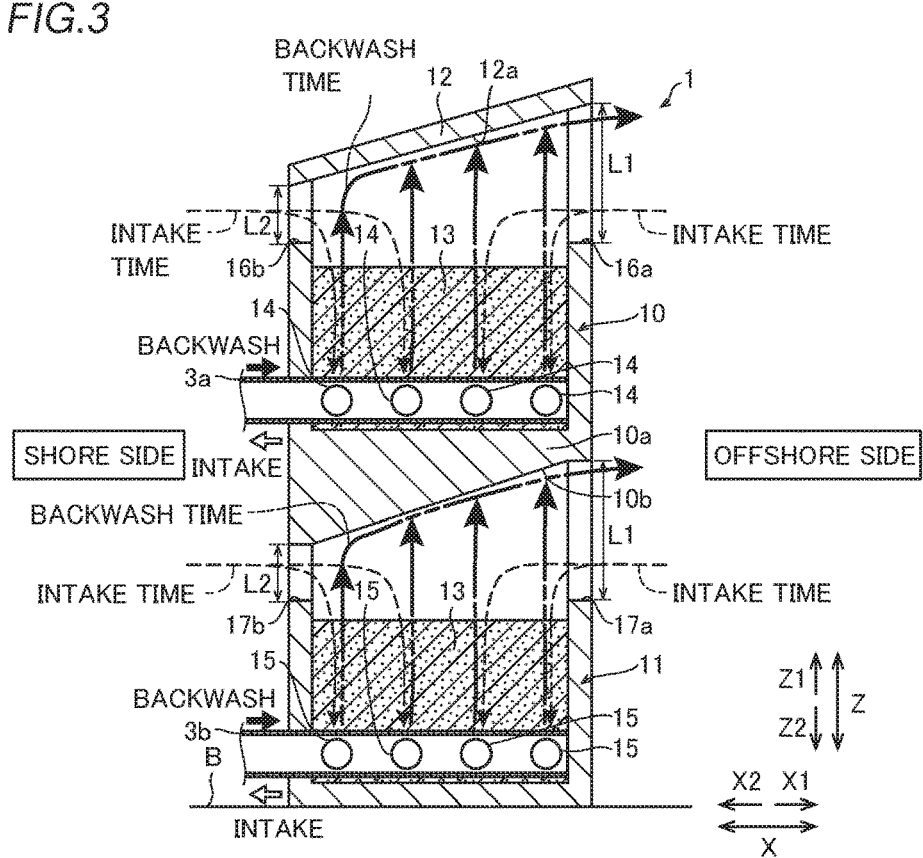
FIG. 3 A sectional view taken along the line 110-110 in FIG. 2.

The filter storage portions 10 and 11 store the filters 13 for removing foreign matter from the raw water in cubic spaces thereof, as shown in FIG. 3. Branch pipes 3*a* and 3*b* branching from the intake pipe 3 and pluralities of screen pipes 14 and 15 are arranged under the filters 13 (along arrow Z2) stored in the filter storage portions 10 and 11 respectively.

The filters 13 are formed by arranging sand or gravel so that the particle diameter thereof is gradually increased upward from below, for example. One or more types of sand, gravel, spheres made of resin or ceramic, porous bodies made of resin or ceramic, substances formed by bundling nonwoven fabric or fiber and working the same into spheres or pellets and the like can be used as the filters 13. The filters 13 have functions of circulating the raw water downward from above at the intake time thereby supplying the treated water obtained by removing foreign matter from the raw water to the screen pipe 14 or 15. Further, the filters 13 circulate the treated water therein upward from below through the screen pipe 14 or 15 at the backwash time, thereby discharging foreign matter upward as wastewater along with the treated water. Thus, the filters 13 are washed.

The infiltration intake system 100 is configured to supply the treated water passing through the filters 13 to the intake pipe 3 through the branch pipes 3*a* and 3*b* and the screen pipes 14 and 15. The branch pipes 3*a* and 3*b* extend to pass through the infiltration intake structural body 1 in the horizontal direction (a direction X), and are connected with the intake pipe 3 on the side X1. The plurality of screen pipes 14 communicate with the branch pipe 3*a* in a state orthogonal thereto in a horizontal plane. On the other hand, the plurality of screen pipes 15 communicate with the branch pipe 3*b* in a state orthogonal thereto in a horizontal plane. The screen pipes 14 and 15 are provided with extremely large numbers of slits 14*a* and 15*b* (see FIG. 7) for introducing the treated water passing through the filters 13 into the screen pipes 14 and 15 respectively, as shown in FIG. 3. The branch pipes 3*a* and 3*b* and the screen pipes 14 and 15 are examples of the "water guide portion" in the present invention.

The infiltration intake structural body 1 is provided with offshore-side openings 16*a* and 17*a* and shore-side openings 16*b* and 17*b* on sidewall portions along the direction X. The offshore-side openings 16*a* and 17*a* and the shore-side openings 16*b* and 17*b* have rectangular opening shapes (see FIG. 2). The offshore-side opening 16*a* and the shore-side opening 16*b* are so provided on the infiltration intake structural body 1 that the filter storage portion 10 communicates with the exterior. On the other hand, the offshore-side opening 17*a* and the shore-side opening 17*b* are so provided on the infiltration intake structural body 1 that the filter storage portion 11 communicates with the exterior. The offshore-side openings 16a and 17a are provided on the offshore-side wall portion (along arrow X1) of the infiltration intake structural body 1. On the other hand, the shore-side openings 16b and 17b are provided on the shore-side wall portion (along arrow X2) of the infiltration intake structural body 1. The offshore-side openings 16a and 17a are examples of the "second opening" in the present invention, and the shore-side openings 16b and 17b are examples of the "first opening" in the present invention.

On an upper portion of the infiltration intake structural body 1, the offshore-side opening 16a is so formed as to have a larger opening area than the shore-side opening 16b. Similarly, the offshore-side opening 17a is so formed as to have a larger opening area than the shore-side opening 17b on a lower portion of the infiltration intake structural body 1. The offshore-side opening 16a and the shore-side opening 16b have substantially identical lengths in the direction Y, while the offshore-side opening 17a and the shore-side opening 17b also have substantially identical lengths in the direction Y. In the vertical direction, on the other hand, the offshore-side openings 16a and 17b are so formed as to have lengths L1 larger than the lengths L2 of the shore-side openings 16b and 17b.

According to the first embodiment, the ceiling surface 12a of the ceiling portion 12 opposed to the upper filter storage portion 10 is linearly inclined obliquely upward from the side X2 (the side of the shore-side opening 16b) toward the side X1 (the side of the offshore-side opening 16a). On the other hand, the ceiling surface 12a is not inclined in the direction Y. Thus, wastewater discharged upward from the filter storage portion 10 at the backwash time is guided along the ceiling surface 12a inclined obliquely upward from the side X2 toward the side X1, to flow toward the direction X1. Then, the wastewater is discharged sideward from the infiltration intake structural body 1 through the offshore-side opening 16a provided on the side X1 of the infiltration intake structural body 1 at the backwash time. Thus, the wastewater is inhibited from returning into the filter 13 of the filter storage portion 10. The ceiling surface 12a is an example of the "wastewater discharge direction control portion" or the "guide portion" in the present invention, and the direction X1 is an example of the "prescribed wastewater discharge direction" in the present invention.

The ceiling surface 10b of the lower portion 10a opposed to the lower filter storage portion 11 is also inclined obliquely upward from the side X2 (the side of the shore-side opening 17b) toward the side X1 (the side of the offshore-side opening 17a), similarly to the ceiling surface 12a. However, the ceiling surface 10b is not inclined in the direction Y. Thus, wastewater discharged upward from the filter storage portion 11 is guided along the ceiling surface 10b to flow toward the direction X1 at the backwash time. Further, the wastewater is discharged sidewise from the infiltration intake structural body 1 through the shore-side opening 17a provided on the side X1 of the infiltration intake structural body 1 at the backwash time. Thus, the wastewater is inhibited from returning to the filter 13 provided in the filter storage portion 11. The ceiling surface 10b is an example of the "wastewater discharge direction control portion" or the "guide portion" in the present invention.

At the backwash time, the wastewater is discharged sidewise from the infiltration intake structural body 1 through the offshore-side openings 16a and 17a provided on the side X1 of the infiltration intake structural body 1, whereby the same can be inhibited from being reflected on the shore 5 and reaching the filters 13 again, dissimilarly to a case where the wastewater is discharged toward the shore side. Such backwash operations are substantially simultaneously performed in both of the filter storage portions 10 and 11 in a prescribed infiltration intake structural body 1. Thus, the filter 13 stored in the filter storage portion 10 or 11 can be inhibited from intaking the wastewater discharged from the filter storage portion 11 or 10.

On the other hand, the plurality of infiltration intake structural bodies 1 are configured to perform backwash operations not simultaneously but at different timings, as shown in FIG. 1. Thus, also when only one of the infiltration intake structural bodies 1 performs a backwash operation while the remaining infiltration intake structural bodies 1 perform water intake operations, the filters 13 of the infiltration intake structural body 1 performing the backwash operation is inhibited from intaking wastewater discharged from the remaining infiltration intake structural bodies 1 due to the wastewater discharge direction controlled to the direction X1 different from the direction Y.

The direction X1 for discharging wastewater is different from the direction (the direction Y) where the remaining infiltration intake structural bodies 1 are set, whereby the wastewater is inhibited from reaching the filters 13 of the remaining infiltration structural bodies 1. Further, no openings are provided on sidewall portions of each infiltration intake structural body 1 along the direction Y, as shown in FIG. 2. Thus, no raw water is discharged from both sides of the infiltration intake structural body 1 in the direction Y at the backwash time, whereby the wastewater is inhibited from reaching the filters 13 of the remaining infiltration intake structural bodies 1 also according to this.

(Effects of First Embodiment)

According to the first embodiment, the following effects can be attained:

According to the first embodiment, as hereinabove described, each infiltration intake structural body 1 is integrally provided with the ceiling surfaces 10b and 12a controlling the discharge direction for the wastewater discharged from the filters 13 toward the raw water side to the direction X1 other than the direction Y where the remaining infiltration intake structural bodies 1 are set at the time of the backwash operation utilizing the water level difference H2 between the water surface S2 of the treated water in the intake well 2 and the water surface S1 of the raw water. Thus, the ceiling surfaces 10b and 12a integrally provided on the infiltration intake structural body 1 can reliably inhibit the wastewater from reaching the filters 13 of the remaining infiltration intake structural bodies 1 at the backwash time without providing a water discharge pipe or a driving source for driving the water discharge pipe to inject water. Consequently, the wastewater can be inhibited from reaching the filters 13 of the remaining infiltration intake structural bodies 1 while suppressing increase in number of components and complication of the structure of the infiltration intake system 100.

According to the first embodiment, the ceiling surfaces 10b and 12a are configured to guide the wastewater discharged upward from the filters 13 toward the raw water side at the backwash time for discharging the same sidewise from the infiltration intake structural body 1 through the offshore-side openings 16a and 17a. Thus, the wastewater discharged upward from the filters 13 toward the raw water side can be discharged sidewise from the infiltration intake structural body 1 due to the ceiling surfaces 10b and 12a, whereby foreign matter contained in the wastewater can be inhibited from falling by its own weight and reaching the filters 13 again.

According to the first embodiment, the ceiling surfaces 10*b* and 12*a* are formed in the infiltration intake structural body 1 above the filter storage portions 10 and 11 to be opposed to the filter storage portions 10 and 11 respectively and to be inclined obliquely upward toward the prescribed wastewater discharge direction (the direction X1) previously set sidewise. Thus, the upwardly discharged wastewater can be reliably guided toward the direction X1 along the ceiling surfaces 10*b* and 12*a* inclined obliquely upward toward the direction X1, whereby the same can be reliably discharged from the previously set side portion along arrow X1.

According to the first embodiment, the offshore-side openings 16*a* and 17*a* are provided on the side X1 of the infiltration intake structural body 1, and so formed as to have larger opening areas than the shore-side openings 16*b* and 17*b* respectively. Thus, the wastewater is more easily discharged from the offshore-side openings 16*a* and 17*a* having larger opening areas than the shore-side openings 16*b* and 17*b* as compared with from the shore-side openings 16*b* and 17*b*, whereby the same can be easily discharged from the offshore-side openings 16*a* and 17*a* provided on the side X1.

According to the first embodiment, the infiltration intake structural body 1 is provided with the plurality of (the pair of) filter storage portions 10 and 11 provided at the prescribed interval in the vertical direction (the direction Z). Further, the lower surface of the lower portion 10*a* of the filter storage portion 10 positioned on the upper side forms the ceiling surface 10*b* guiding the wastewater from the filter storage portion 11 positioned on the lower side to discharge the same sidewise from the infiltration intake structural body 1 along arrow X1 at the backwash time. Thus, the lower portion 10*a* of the filter storage portion 10 is so utilized as the ceiling surface 10*b* that the wastewater can be discharged while effectively suppressing increase in number of components.

[Second Embodiment]

The overall structure of an infiltration intake system 200 according to a second embodiment of the present invention is described with reference to FIGS. 1, 4 and 5. In the infiltration intake system 200 according to the second embodiment of the present invention, a ceiling surface 112*a* similar in structure to the ceiling surface 12*a* according to the aforementioned first embodiment has a sectional shape tapered upward and formed to extend toward a direction X1. Structures of the second embodiment similar to those in the aforementioned first embodiment are denoted by the same reference signs, and redundant description is not repeated.

(Structure of Infiltration Intake System)

The infiltration intake system 200 according to the second embodiment of the present invention includes a plurality of (e.g., three) infiltration intake structural bodies 101 set in raw water, a plurality of intake wells 2 corresponding to the infiltration intake structural bodies 101 respectively and intake pipes 3, as shown in FIG. 1.

<Structure of Infiltration Intake Structural Body>

Figure 4:
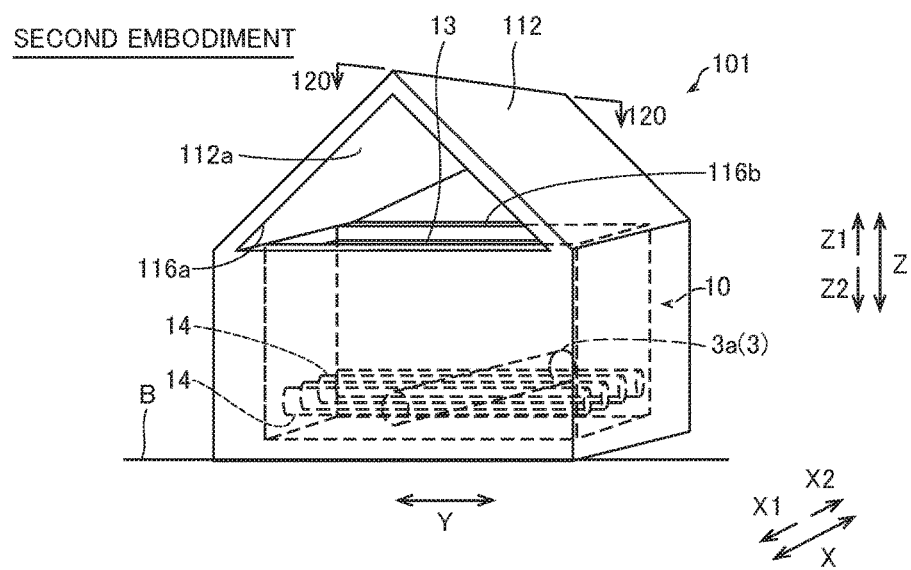
FIG. 4 A perspective view showing an infiltration intake structural body according to a second embodiment of the present invention.
Figure 5:
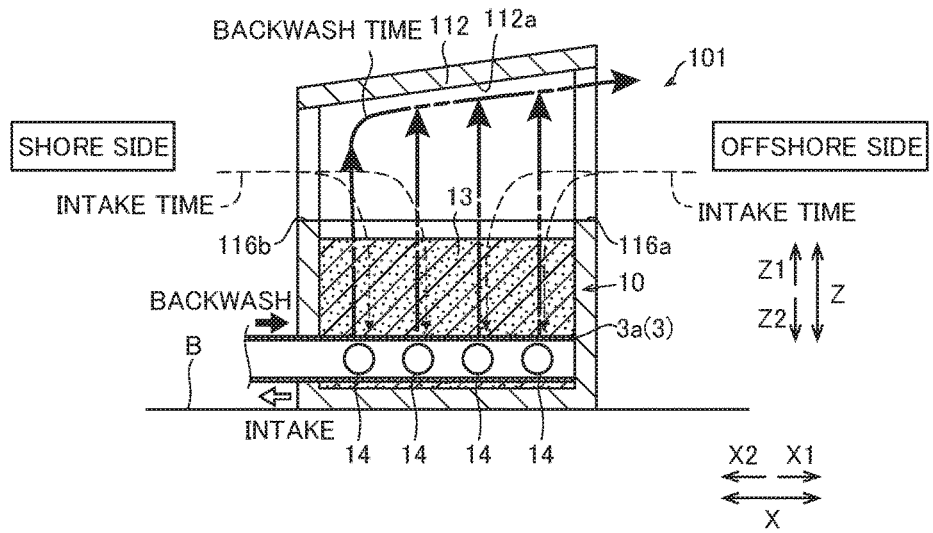
FIG. 5 A sectional view taken along the line 120-120 in FIG. 4.

Each infiltration intake structural body 101 includes a filter storage portion 10 storing a filter 13 as well as a branch pipe 3*a* and screen pipes 14 arranged on a lower portion in the filter 13, as shown in FIG. 4. The infiltration intake structural body 101 is an example of the "structural body" in the present invention.

The infiltration intake structural body 101 is provided with an offshore-side opening 116*a* on a sidewall portion along arrow X1 (a side portion) and a shore-side opening 116*b* on a sidewall portion along arrow X2 (another side portion). Both of the offshore- and shore-side openings 116*a* and 116*b* have triangular opening shapes tapered upward. Further, the offshore- and shore-side openings 116*a* and 116*b* are so provided on the infiltration intake structural body 101 that the filter storage portion 10 communicates with the exterior. The offshore- and shore-side openings 116*a* and 116*b* are examples of the "second opening" and the "first opening" in the present invention respectively.

According to the second embodiment, the ceiling surface 112*a* of a ceiling portion 112 opposed to the filter storage portion 10 is linearly inclined obliquely upward from the side X2 (the side of the shore-side opening 116*b*) toward the side X1 (the side of the offshore-side opening 116*a*). Further, the ceiling surface 112*a* is inclined obliquely upward toward a central portion in a direction Y. Consequently, the ceiling surface 112*a* has an upwardly tapered triangular sectional shape orthogonal to a direction X1 (a wastewater discharge direction), and is so formed that the triangular section extends toward the direction X1. Thus, a flow of water toward the direction X1 can be formed through the ceiling surface 112*a* tapered toward the central portion in the direction Y while forming a vortex with the tapered portion. Consequently, wastewater discharged upward from the filter storage portion 10 at a backwash time is guided along the ceiling surface 112*a* while swirling in the vicinity of the center of the ceiling surface 112*a*, to flow toward the direction X1. Then, the wastewater is discharged sidewise from the infiltration intake structural body 101 through the offshore-side opening 116*a* provided on the side X1 of the infiltration intake structural body 101. The ceiling surface 112*a* is an example of the "wastewater discharge direction control portion" or the "guide portion" in the present invention. The remaining structures of the second embodiment are similar to those of the aforementioned first embodiment.

(Effects of Second Embodiment)

According to the second embodiment, the following effects can be attained:

According to the second embodiment, as hereinabove described, each infiltration intake structural body 101 is provided with the ceiling portion 112*a* controlling the discharge direction for the wastewater discharged from the filter 13 toward a raw water side at the backwash time to the direction X1 other than the direction Y where the remaining infiltration intake structural bodies 101 are set. Thus, the wastewater can be inhibited from reaching the filters 13 of the remaining infiltration intake structural bodies 101 at the backwash time while suppressing increase in number of components and complication of the structure of the infiltration intake system 200, similarly to the aforementioned first embodiment.

According to the second embodiment, the ceiling surface 112*a* is so formed as to have the upwardly tapered triangular sectional shape orthogonal to the direction X1 and formed to extend toward the direction X1. Thus, a flow of water directed toward the direction X1 while swirling on the tapered portion can be so formed that the upwardly discharged wastewater can be more reliably guided to the wastewater discharge direction. Consequently, the wastewater can be more reliably discharged from a previously set side portion (the offshore-side opening 116*a*) along arrow X1. The remaining structures of the second embodiment are similar to those of the aforementioned first embodiment.

[Third Embodiment]

An infiltration intake system 300 according to a third embodiment of the present invention is described with reference to FIGS. 6 and 7. In the infiltration intake system 300 according to the third embodiment of the present invention, downstream-side openings 216a and 217a and upstream-side openings 216b and 217b are provided along a flow (a rip current) directed toward each infiltration intake structural body 201. Structures of the third embodiment similar to those in the aforementioned first embodiment are denoted by the same reference signs, and redundant description is not repeated.

(Structure of Infiltration Intake System)

Figure 6:
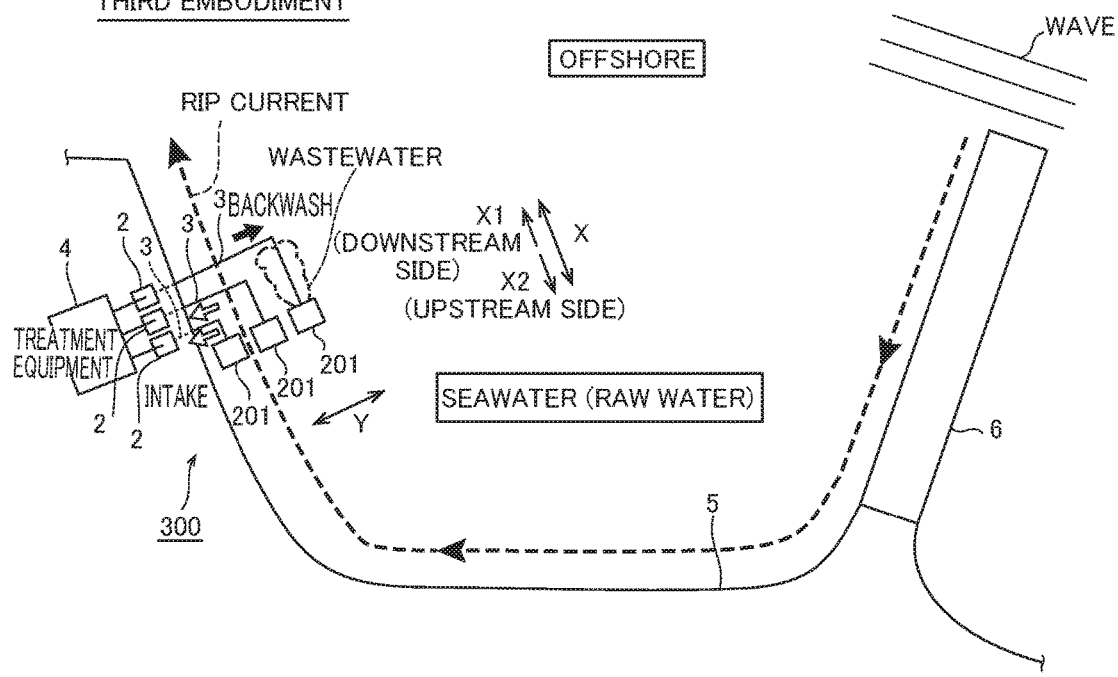
FIG. 6 A schematic diagram showing an example of a position where an infiltration intake structural body of an infiltration intake system according to a third embodiment of the present invention is set.

The infiltration intake system 300 according to the third embodiment of the present invention includes a plurality of (e.g., three) infiltration intake structural bodies 201 set in raw water, a plurality of intake wells 2 corresponding to the infiltration intake structural bodies 201 respectively and intake pipes 3, as shown in FIG. 6. The plurality of infiltration intake structural bodies 201 are set along a seashore 5 in a U-shaped bay formed by the seashore 5 and a dike 6. Waves directed toward the dike 6 from an offshore side flow along the dike 6 and the seashore 5, to form a flow directed from the seashore 5 toward the offshore side. The plurality of infiltration intake structural bodies 201 are so set that this flow (a rip current) is directed toward the same. In other words, the plurality of infiltration intake structural bodies 201 are set on a downstream side (along arrow X1) toward which the rip current is directed. Further, the plurality of infiltration intake structural bodies 201 are set to line up at prescribed intervals in a direction (a direction Y) orthogonal to the direction (along arrow X1) of the rip current.

<Structure of Infiltration Intake Structural Body>

Figure 7:
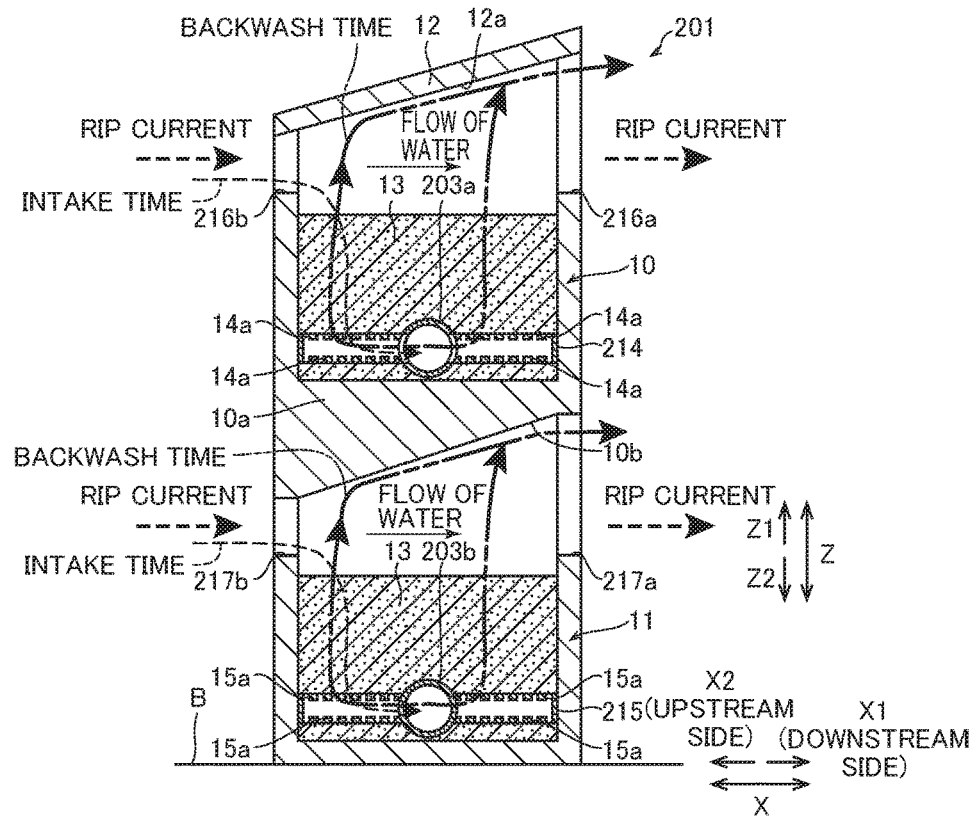
FIG. 7 A sectional view showing the infiltration intake system according to the third embodiment of the present invention.

Each infiltration intake structural body 201 includes filter storage portions 10 and 11 storing filters 13 as well as branch pipes 203 and 203b and pluralities of screen pipes 214 and 215 arranged on lower portions in the filters 13, as shown in FIG. 7. The branch pipes 203a and 203b extend to pass through the infiltration intake structural body 201 in the horizontal direction (the direction perpendicular to the plane of FIG. 7) respectively. The plurality of screen pipes 214 communicate with the branch pipe 203a in a state orthogonal thereto in a horizontal plane. The plurality of screen pipes 215 also communicate with the branch pipe 203b in a state orthogonal thereto in a horizontal plane. The branch pipes 203a and 203b and the screen pipes 214 and 215 are examples of the "water guide portion" in the present invention.

The downstream-side openings 216a and 217a and the upstream-side openings 216b and 217b having rectangular opening shapes are provided on sidewall portions of the infiltration intake structural body 201 in the direction X. The downstream-side openings 216a and 217a are examples of the "second opening" in the present invention, and the upstream-side openings 216b and 217b are examples of the "first opening" in the present invention.

The downstream-side opening 216a and the upstream-side opening 216b are formed along the direction X1 toward which the rip current is directed. The downstream-side opening 217a and the upstream-side opening 217b are also formed along the direction X1. Thus, the rip current forms a flow of water in the direction X1 from the side of the upstream-side opening 216b toward the side of the downstream-side opening 216a and another flow of water in the direction X1 from the side of the upstream-side opening 217b toward the side of the downstream-side opening 217a.

On an upper portion of the infiltration intake structural body 201, the downstream-side opening 216a is so formed as to have a large opening area than the upstream-side opening 216b. Similarly, the downstream-side opening 217a is so formed as to have a large opening area than the upstream-side opening 217b on a lower portion of the infiltration intake structural body 201.

Similarly to the aforementioned first embodiment, wastewater discharged upward from the upper filter storage portion 10 at a backwash time is guided along a ceiling surface 12a inclined obliquely upward from the side X2 toward the side X1, and discharged sidewise from the infiltration intake structural body 201 through the downstream-side opening 216a provided on the side X1 of the infiltration intake structural body 201. Similarly, wastewater discharged upward from the lower filter storage portion 11 at the backwash time is guided along a ceiling surface 10b and discharged sidewise from the infiltration intake structural body 201 through the downstream-side opening 217a provided on the side X1 of the infiltration intake structural body 201.

According to the third embodiment, the rip current forms the flow of water in the direction X1 from the side of the upstream-side opening 216b toward the side of the downstream-side opening 216a and another flow of water in the direction X1 from the side of the upstream-side opening 217b toward the side of the downstream-side opening 217a. Thus, wastewater is discharged sidewise from the infiltration intake structural body 201 through the downstream-side openings 216a and 217a provided on the side X1 of the infiltration intake structural body 201 also through the flows of water in the direction X1, in addition to the ceiling surfaces 12a and 10b inclined obliquely upward from the side X2 toward the side X1. The remaining structures of the third embodiment are similar to those of the aforementioned first embodiment.

(Effects of Third Embodiment)

According to the third embodiment, the following effects can be attained:

According to the third embodiment, as hereinabove described, each infiltration intake structural body 201 is provided with the ceiling surfaces 12a and 10b controlling a discharge direction for the wastewater discharged from the filters 13 toward a raw water side at the backwash time to the direction X1 other than the direction Y where the remaining infiltration intake structural bodies 201 are set. Thus, the wastewater can be inhibited from reaching the filters 13 of the remaining infiltration intake structural bodies 201 at the backwash time while suppressing increase in number of components and complication of the structure of the infiltration intake system 300, similarly to the aforementioned first embodiment.

According to the third embodiment, the downstream-side opening 216a and the upstream-side opening 216b are formed along the direction X1 toward which the rip current flows, to discharge wastewater from the side of the upstream-side opening 216b toward the side of the downstream-side opening 216a. Similarly, the downstream-side opening 217a and the upstream-side opening 217b are formed along the direction X1 to which the rip current flows, to discharge wastewater from the side of the upstream-side opening 217b toward the side of the downstream-side opening 217a. Thus, the flows of water from the side of the upstream-side opening 216b toward the side of downstream-side opening 216a can be formed in the infiltration intake structural body 201 by simply providing the upstream-side opening 216b and the downstream-side opening 216a in the infiltration intake structural body 201 along the direction (the direction X1) of the rip current. Consequently, wastewater can be efficiently discharged from the downstream-side openings 216a and 217a while suppressing complication of the structure of the infiltration intake system 300. The remaining structures of the third embodiment are similar to those of the aforementioned first embodiment.

[Modifications]

The embodiments disclosed this time must be considered illustrative in all points and not restrictive. The range of the present invention is shown not by the above description of the embodiments but by the scope of claims for patent, and all changes (modifications) within the meaning and range equivalent to the scope of claims for patent are included.

For example, while the infiltration intake system according to the present invention is employed as a system for obtaining clean and clear water (treated water) from seawater (raw water) in each of the aforementioned first to third embodiments, the present invention is not restricted to this. The infiltration intake system according to the present invention may alternatively be employed as a system for obtaining clean and clear water (treated water) from brackish water or fresh water (raw water). In other words, the infiltration intake system according to the present invention is applicable to any equipment requiring treated water obtained by removing foreign matter from raw water, regardless of the type of the raw water or an intake position for the raw water.

Figure 8:
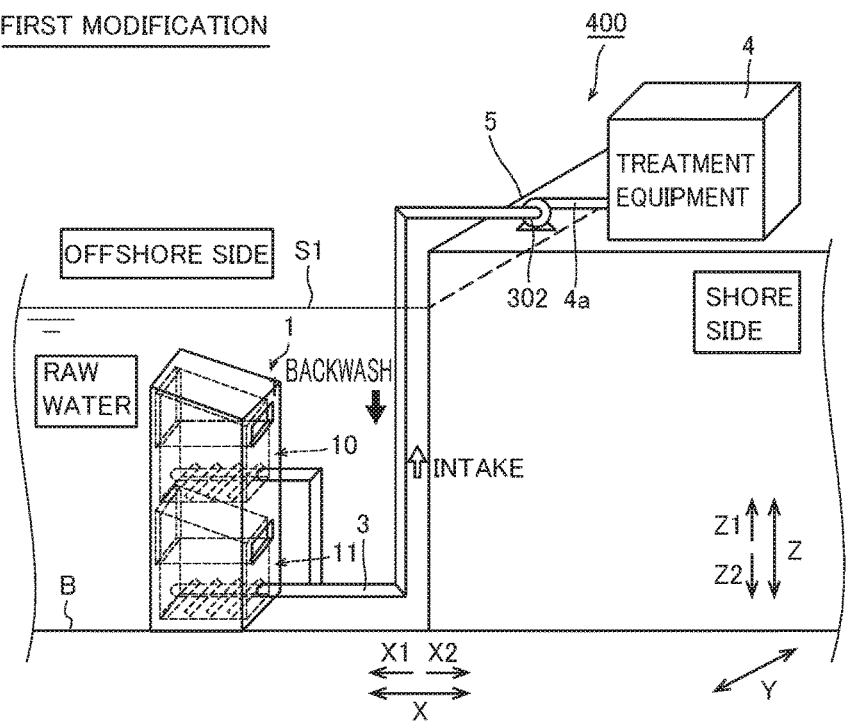
FIG. 8 A schematic perspective view showing an infiltration intake system according to a first modification of the present invention.
Figure 9:
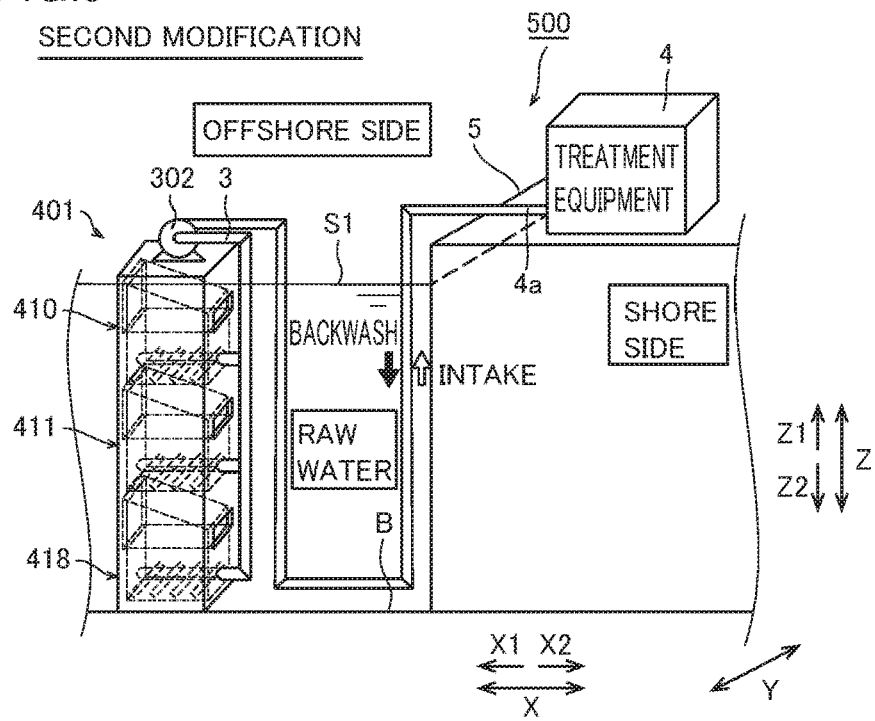
FIG. 9 A schematic perspective view showing an infiltration intake system according to a second modification of the present invention.
Figure 10:
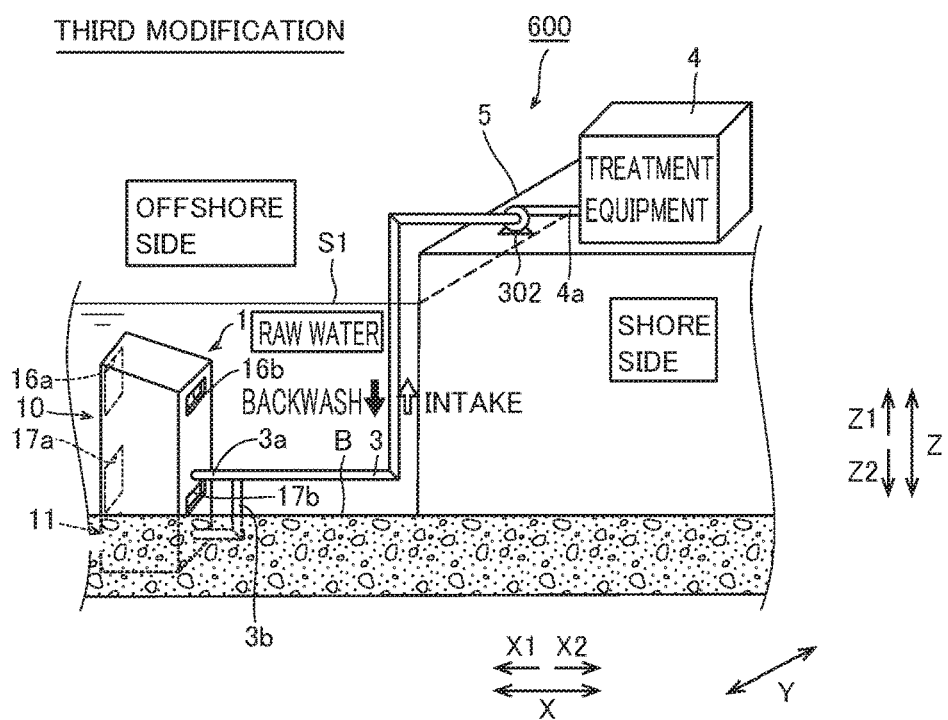
FIG. 10 A schematic perspective view showing an infiltration intake system according to a third modification of the present invention.

While each of the infiltration intake systems 100, 200 and 300 circulates water through the filter(s) 13 from the raw water side toward the treated water side at the intake time and refluxes water through the filter(s) 13 from the treated water side toward the raw water side at the backwash time in each of the aforementioned first to third embodiments, the present invention is not restricted to this. According to the present invention, the infiltration intake system may simply be configured to be capable of circulating water through a filter from a raw water side toward a treated water side at an intake time and refluxing water through the filter from the treated water side toward the raw water side at a backwash time. For example, the infiltration intake system may be configured to be capable of circulating water through filters (a filter) from a raw water side (the side of an infiltration intake structural body 1 (401)) toward a treated water side (the side of a treatment equipment 4) at an intake time and refluxing water through the filter(s) from the treated water side toward the raw water side with a pump 202, as in each of infiltration intake systems 400, 500 and 600 according to first, second and third modifications of the present invention shown in FIGS. 8, 9 and 10 respectively. The pump 302 may be individually provided on each of a plurality of infiltration intake structural bodies 1 (401), or may be shared by the plurality of infiltration intake structural bodies 1 (401). The infiltration intake structural body 401 is an example of the "structural body" in the present invention, and the pump 302 is an example of the "backwash mechanism portion" in the present invention.

The pump 302 may be provided on a shore side as in each of the first and third modifications, or may be provided on the upper surface of the infiltration intake structural body 401 protruding from a water surface as in the second modification. When the pump 302 is provided on the upper surface of the infiltration intake structural body 401, the piping length from the pump 302 to each of filter storage portions 410, 411 and 418 can be prevented from increase as compared with the case where the pump 302 is provided on the shore side, whereby an intake pipe 3 can be prevented from generation remarkable pressure loss. Thus, the pump 302 can be prevented from reduction in net positive suction head, whereby the same can be prevented from cavitation.

While the infiltration intake system refluxes water through the filter(s) 13 from the treated water side toward the raw water side at the backwash time in each of the aforementioned first to third embodiments, the present invention is not restricted to this. According to the present invention, the infiltration intake system may alternatively reflux air through the filter(s) from the treated water side toward the raw water side at the backwash time, thereby discharging water and foreign matter from the infiltration intake structural body through the filter to follow the flow of air. In this case, a pneumatic apparatus for compressing and refluxing air is preferably set on the upper surface of the infiltration intake structural body 401, similarly to the pump 302 according to the second modification shown in FIG. 9. Thus, the piping length from the pump 302 to each of the filter storage portions 410, 411 and 418 can be inhibited from increase, whereby pressure loss of air can be reduced. Further, volume change of air in the intake pipe can be reduced when compressing air, whereby a time difference between an instruction for injecting air and actual injection of air into filters stored in filter storage portions 10 and 11 can be reduced.

While the infiltration intake structural body 1 (201) is provided with the pair of filter storage portions 10 and 11 in each of the aforementioned first and third embodiments and the infiltration intake structural body 101 is provided with the single filter storage portion 10 in the aforementioned second embodiment, the present invention is not restricted to this. According to the present invention, the infiltration intake structural body may alternatively be provided at least three filter storage portions. For example, three filter storage portions 410, 411 and 418 may be stacked in the vertical direction (a direction Z) in the infiltration intake structural body 401, as in the infiltration intake system 500 according to the second modification shown in FIG. 9. Thus, the number of infiltration intake structural bodies 401 necessary for ensuring a desired number of filter storage portions can be reduced, whereby the period of construction work on a water bottom surface B for setting each infiltration intake structural body 401 can be further reduced, and the range of the construction work on the water bottom surface B can also be further narrowed.

While the infiltration intake structural body is entirely provided on the water bottom surface B of the raw water in each of the aforementioned first to third embodiments, the present invention is not restricted to this. According to the present invention, the infiltration intake structural body 1 may alternatively be embedded in a water bottom to be partially provided on the water bottom surface B of the raw water, as in the infiltration intake system 600 according to the third modification shown in FIG. 10. Thus, the infiltration intake structural body 1 can be stably set in the raw water. In this case, the infiltration intake structural body 1 must be so embedded in the water bottom that an offshore-side opening 17a and a shore-side opening 17b corresponding to the lower filter storage portion 11 are positioned upward beyond the water bottom surface B.

While the rip current is employed, the ceiling surfaces 10b and 12a are inclined obliquely upward toward the wastewater discharge direction (along arrow X1) in the infiltration intake structural body 201 and the downstream-side openings 216a and 217a provided on the side of the wastewater discharge direction (along arrow X1) have larger opening areas than the upstream-side openings 216b and 217b in the aforementioned third embodiment, the present invention is not restricted to this. When employing a rip current, ceiling surfaces 610b and 612a may not be inclined obliquely upward but may be formed to extend in horizontal planes while downstream-side openings 616a and 617a may have opening areas substantially equal to those of upstream-side openings 616b and 617b respectively as in an infiltration intake structural body 601 according to a fourth modification shown in FIG. 11, for example. Also in this case, flows of water from the side of the upstream-side opening 616b toward the side of the downstream-side opening 616a and from the side of the upstream-side opening 617b toward the side of the downstream-side opening 617a can be formed through the rip current. The downstream-side openings 616a and 617a are examples of the "second opening" in the present invention, and the upstream-side openings 616b and 617b are examples of the "first opening" in the present invention.

While the offshore-side (downstream-side) openings and the shore-side (upstream-side) openings are provided on the sidewall portions of the infiltration intake structural body in the direction X and no openings are provided on sidewall portions of the infiltration intake structural body in the direction Y in each of the aforementioned first to third embodiments, the present invention is not restricted to this. According to the present invention, openings may alternatively be provided also on the sidewall portions of the infiltration intake structural body (the structural body) in the direction Y. In this case, the openings provided on the sidewall portions of the infiltration intake structural body in the direction Y preferably have smaller opening areas than the openings provided on the sidewall portions of the infiltration intake structural body in the direction X.

While the plurality of screen pipes are provided in the filter in each of the aforementioned first to third embodiments, the present invention is not restricted to this. According to the present invention, the screen pipes may be substituted by perforated (porous) pipes each provided with a plurality of holes having a hole diameter substantially not passing a filter therethrough or reticular screens having meshes of sizes substantially not passing a filter therethrough and dividing branch pipes and the filter from each other.

While the plurality of (three) infiltration intake structural bodies are set in each of the aforementioned first to third embodiments, the present invention is not restricted to this. According to the present invention, the number of infiltration intake structural bodies (structural bodies) is not restricted. In a case of setting a large number of infiltration intake structural bodies, the remaining infiltration intake structural bodies are preferably not set in a wastewater discharge direction in each infiltration intake structural body, so that the remaining infiltration intake structural bodies do not intake wastewater discharged from each infiltration intake structural body. When the number of infiltration intake structural bodies is so large that the remaining infiltration intake structural bodies must be set in a wastewater discharge direction in each infiltration intake structural body, the infiltration intake structural bodies are preferably set at sufficient intervals from each other, so that the remaining infiltration intake structural bodies do not intake wastewater discharged from each infiltration intake structural body.

While the wastewater discharge direction is rendered different from the direction where the remaining infiltration intake structural bodies are set in each of the aforementioned first to third embodiments, the present invention is not restricted to this. When an equipment such as an aquaculture farm requiring clean and clear water is provided in the periphery of each infiltration intake structural body (the structural body), for example, the wastewater discharge direction may alternatively be rendered different from the direction where the aquaculture farm is set.

While the infiltration intake structural body 201 is so set that the rip current is directed toward the same in the aforementioned third embodiment, the present invention is not restricted to this. According to the present invention, the flow toward the infiltration intake structural body (the structural body) is not restricted to the rip current. For example, the infiltration intake structural body may alternatively be set on a downstream side of a river, so that the flow of the river is directed toward the infiltration intake structural body.

While the ceiling surface 112a has the upwardly tapered triangular sectional shape orthogonal to the direction X1 (the wastewater discharge direction) and formed to extend toward the wastewater discharge direction in the aforementioned second embodiment, the present invention is not restricted to this. For example, the ceiling surface may alternatively have an upwardly tapered arcuate (inverted U-shaped) sectional shape orthogonal to the wastewater discharge direction and formed to extend toward the wastewater discharge direction.

DESCRIPTION OF REFERENCE NUMERALS 1, 101, 201, 401, 601: infiltration intake structural body (structural body)
2: intake well (backwash mechanism portion)
3: intake pipe (water guide portion)
3a, 3b, 203a, 203b: branch pipe (water guide portion)
4: treatment equipment
10, 11, 310, 311, 318: filter storage portion
10a: lower portion
10b, 12a, 112a: ceiling surface (wastewater discharge direction control portion, guide portion)
13: filter
14, 15, 214, 215: screen pipe (water guide portion)
16a, 17a, 116a: offshore-side opening (second opening)
16b, 17b, 116b: shore-side opening (first opening)
100, 200, 300, 400, 500, 600: infiltration intake system
216a, 217a, 616a, 617a: downstream-side opening (second opening)
216b, 217b, 616b, 617b: upstream-side opening (first opening)
302: pump (backwash mechanism portion)
B: water bottom surface
X1: prescribed wastewater discharge direction

The invention claimed is:

1. An infiltration intake system comprising:
a structural body, set on a water bottom surface of raw water, including a filter storage portion;
a filter stored in the filter storage portion;
a water guide portion for guiding treated water passing through the filter toward the side of a treatment equipment; and
a backwash mechanism portion for washing the filter by refluxing water or air from a treated water side of the filter toward a raw water side, wherein
the structural body integrally includes a wastewater discharge direction control portion for controlling a discharge direction for wastewater discharged from the filter toward the raw water side to a prescribed wastewater discharge direction at a backwash time with the backwash mechanism portion, and
wherein the wastewater discharged from the filter is discharged upwardly and the wastewater discharge direction control portion includes a guide portion for guiding wastewater discharged upwardly from the filter to discharge the wastewater sidewise from the structural body as the prescribed wastewater discharge direction at the backwash time.

2. The infiltration intake system according to claim 1, wherein
the guide portion has a ceiling surface formed above the filter storage portion in the structural body to be opposed to the filter storage portion and inclined obliquely upward toward the prescribed wastewater discharge direction previously set sidewise.

3. The infiltration intake system according to claim 1, wherein
the structural body includes a first opening and a second opening so provided as to open on side portions of the structural body, and
the second opening is provided on the downstream side of a water flow direction towards the structural body in the raw water at the backwash time and has a large opening area than the first opening.

4. The infiltration intake system according to claim 1, wherein
the structural body includes a plurality of the filter storage portions stacked at prescribed intervals in the vertical direction, and
a lower portion of the filter storage portion positioned on the upper side among the plurality of filter storage portions constitutes a ceiling to the lower side filter storage portion and guides the wastewater to discharge the wastewater sidewise from the structural body at the backwash time.

5. The infiltration intake system according to claim 1, wherein
the guide portion is configured to guide the wastewater discharge direction to a sidewise direction other than a direction where another structural body is set in the periphery.

6. An infiltration intake system comprising:
a structural body, set on a water bottom surface of raw water, including a filter storage portion;
a filter stored in the filter storage portion;
a water guide portion for guiding treated water passing through the filter toward the side of a treatment equipment; and
a backwash mechanism portion for washing the filter by refluxing water or air from a treated water side of the filter toward a raw water side, wherein
the structural body integrally includes a wastewater discharge direction control portion for controlling a discharge direction for wastewater discharged from the filter toward the raw water side to a prescribed wastewater discharge direction at a backwash time with the backwash mechanism portion,
wherein the wastewater discharge direction control portion includes a first opening and a second opening so provided as to oppositely open on side portions of the structural body, and the first opening and the second opening are so arranged along a water flow direction toward the structural body in the raw water that the wastewater is discharged from the side of the first opening toward the side of the second opening.

* * * * *